(12) United States Patent
Ueki

(10) Patent No.: US 12,169,749 B2
(45) Date of Patent: Dec. 17, 2024

(54) RFID MODULE, RFID TAG, AND RFID TAGGED ARTICLE

(71) Applicant: Murata Manufacturing Co., Ltd., Nagaokakyo (JP)

(72) Inventor: Noriyuki Ueki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 60 days.

(21) Appl. No.: 17/653,963

(22) Filed: Mar. 8, 2022

(65) Prior Publication Data

US 2022/0188586 A1    Jun. 16, 2022

Related U.S. Application Data

(63) Continuation of application No. PCT/JP2020/016093, filed on Apr. 10, 2020.

(30) Foreign Application Priority Data

Sep. 30, 2019   (JP) ................................ 2019-178309

(51) Int. Cl.
*G06K 19/07*   (2006.01)
*G06K 19/077*   (2006.01)
(Continued)

(52) U.S. Cl.
CPC ..... *G06K 19/0708* (2013.01); *G06K 19/0723* (2013.01); *G06K 19/07747* (2013.01);
(Continued)

(58) Field of Classification Search
CPC .......... G06K 19/0708; G06K 19/0723; G06K 19/07747; G06K 19/07783; H01Q 1/2208; H01Q 7/00
(Continued)

(56) References Cited

U.S. PATENT DOCUMENTS

| | | | |
|---|---|---|---|
| 2008/0210762 A1* | 9/2008 | Osada .............. | G06K 19/07773 235/492 |
| 2013/0016021 A1* | 1/2013 | Blair .................... | H01Q 21/061 343/720 |

(Continued)

FOREIGN PATENT DOCUMENTS

| | | |
|---|---|---|
| JP | 2007076068 A | 3/2007 |
| WO | 2018101315 A1 | 6/2018 |

OTHER PUBLICATIONS

International Search Report issued for PCT/JP2020/016093, date of mailing Jul. 14, 2020.
(Continued)

*Primary Examiner* — Michael G Lee
*Assistant Examiner* — David Tardif
(74) *Attorney, Agent, or Firm* — ArentFox Schiff LLP

(57) ABSTRACT

An RFID module is disposed at a position where the RFID module is electromagnetically coupled to the conductor. An RFIC receives power induced by receiving an electromagnetic wave for power reception to output a transmission signal. A power reception coupling unit is electromagnetically coupled to the conductor to receive power. A transmission coupling unit is electromagnetically coupled to the conductor to output a transmission signal to the conductor.

18 Claims, 15 Drawing Sheets

(51) Int. Cl.
*H01Q 1/22* (2006.01)
*H01Q 7/00* (2006.01)

(52) U.S. Cl.
CPC ..... *G06K 19/07783* (2013.01); *H01Q 1/2208* (2013.01); *H01Q 7/00* (2013.01)

(58) Field of Classification Search
USPC ......................................................... 235/492
See application file for complete search history.

(56) References Cited

U.S. PATENT DOCUMENTS

| 2014/0117095 | A1* | 5/2014 | Choi | G06K 19/07783 |
| | | | | 235/492 |
| 2019/0156175 | A1* | 5/2019 | Eshima | G06K 19/025 |
| 2021/0334486 | A1* | 10/2021 | De Oliveira | G06K 19/07786 |

OTHER PUBLICATIONS

Roberti, Mark; "Wiliot Unveils Passive Bluetooth Sensor"; (registered trademark); [online, [searched on Sep. 11, 2019], Internet <URL: https://www.rfidjournal.com/articles/view?18235>.

* cited by examiner

RFID MODULE, RFID TAG, AND RFID TAGGED ARTICLE

CROSS REFERENCE TO RELATED APPLICATIONS

The present application is a continuation of PCT/JP2020/016093 filed Apr. 10, 2020, which claims priority to Japanese Patent Application No. 2019-178309, filed Sep. 30, 2019, the entire contents of each of which are incorporated herein by reference.

TECHNICAL FIELD

The present invention relates to an RFID module forming, for example, an RFID tag, an RFID tag including the RFID module, and an RFID tagged article.

BACKGROUND

Non Patent Literature 1 (identified below) discloses a passive Bluetooth® sensor. This device detects a temperature, a pressure, and a motion using RF power such as radio waves of a wireless LAN and radio waves of a mobile phone to transmit the information by Bluetooth®. This device communicates in the following manner rather than a manner of returning a reflected signal to a reader like a passive UHF RFID transponder. First, the radio wave is received not as a signal, but as energy to be charged, and when sufficient energy is charged, part of the message is transmitted, and it waits for the further energy to be charged. The next part of the message is then transmitted. That is, while energy is received from surrounding radio waves, messages are divided and sequentially transmitted.

[Non Patent Literature 1]: Mark Roberti, "Wiliot Unveils Passive Bluetooth (registered trademark) Sensor", [online, [searched on Sep. 11, 2019], Internet <URL: https://www.rfidjournal.com/articles/view?18235>

In the device described in Non Patent Literature 1, it is necessary to individually provide two antennas that receive surrounding radio waves and an antenna that transmits a signal by Bluetooth®. Therefore, when an RFID tag including a plurality of antennas and an RFIC is configured, the RFID tag is large as a whole, and there is a concern that the application range is limited. In addition, when an RFID tag is provided on a conductive article or when an RFID tag is provided on a conductive member that is part of an article, an antenna of the RFID tag is easily affected by the article having conductive or the conductive member. That is, the characteristics of the RFID tag alone and the characteristics of the RFID tag in a state of being attached to an article can change greatly.

SUMMARY OF THE INVENTION

Therefore, it is an object of the present invention to provide an RFID module that exhibits predetermined RFID tag characteristics when an RFID tag is provided on an article having conductivity or when an RFID tag is provided on a conductive member that is part of an article. Moreover, exemplary embodiments include an RFID tag including the RFID module, and an RFID tagged article.

In an exemplary aspect, the RFID module is disposed at a position where the RFID module is electromagnetically coupled to the conductor. The RFID module includes an RFIC that receives power induced by receiving an electromagnetic wave for power reception to output a transmission signal, a power reception coupling unit electromagnetically coupled to the conductor to receive the power, and a transmission coupling unit electromagnetically coupled to the conductor to output a transmission signal to the conductor.

Moreover, an exemplary aspect of the RFID tag includes the RFID module and the conductor.

Furthermore, an exemplary aspect of the RFID tagged article includes the RFID module and an article, part or all of which is the conductor.

According to the exemplary aspects of the present invention, since a plurality of large antennas is unnecessary, a downsized RFID tag can be configured as a whole. In addition, the RFID tag can be easily configured by providing the RFID module on the conductor. Similarly, an RFID tag exhibiting predetermined RFID tag characteristics can be configured by providing an RFID module on a conductive member that is part of an article.

DETAILED DESCRIPTION OF EMBODIMENTS

Figure 1:
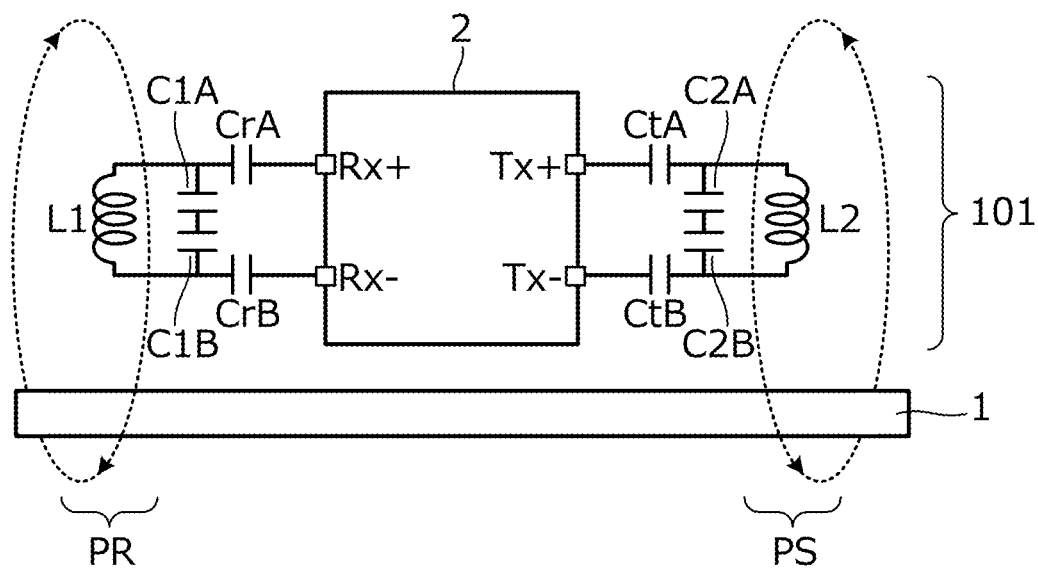
FIG. 1 is a diagram illustrating a circuit configuration of an RFID tag 201 according to a first exemplary embodiment.

Hereinafter, a plurality of modes for carrying out the present invention will be described with some specific examples with reference to the drawings. In the drawings, the same portions are denoted by the same reference numerals. In consideration of the description of main points or ease of understanding, embodiments are divided, but partial replacement or combination of configurations illustrated in different embodiments is possible in alternative aspects. In the second and subsequent embodiments, descriptions of matters common to the first embodiment will be omitted, and only different points will be described. Specifically, the same operation and effect by the same configuration will not be sequentially mentioned for each embodiment.

First Exemplary Embodiment

FIG. 1 is a diagram illustrating a circuit configuration of an RFID tag 201 according to the first exemplary embodiment. As shown, the RFID tag 201 includes a conductor 1 and an RFID module 101 disposed at a position where the RFID module 101 is electromagnetically coupled to the conductor 1.

Moreover, the RFID module 101 includes an RFIC 2, a power reception coupling unit PR connected to the RFIC 2, and a transmission coupling unit PS connected to the RFIC 2.

The power reception coupling unit PR is electromagnetically coupled to the conductor 1 to receive power for power reception. In addition, the transmission coupling unit PS is electromagnetically coupled to the conductor 1 to output a transmission signal for the RFID to the conductor 1.

As further shown, the power reception coupling unit PR includes a coil L1 magnetically coupled to the conductor 1. A series circuit of capacitors C1A and C1B is connected in parallel to the coil L1 to form an LC parallel resonance circuit. The LC parallel resonance circuit is connected to power receiving terminals Rx+ and Rx− of the RFIC 2 via the capacitors CrA and CrB.

The transmission coupling unit PS includes a coil L2 magnetically coupled to the conductor 1. A series circuit of capacitors C2A and C2B is connected in parallel to the coil L2 to form an LC parallel resonance circuit. The LC parallel resonance circuit is connected to transmission terminals Tx+ and Tx− of the RFIC 2 via the capacitors CtA and CtB.

In the exemplary aspect, the parallel circuit of the coil L1 and the capacitors C1A and C1B forms an LC resonance circuit, and the resonance frequency is defined within the power reception frequency band. For example, it is defined to resonate with radio waves in the 1.7 GHz band to the 2.5 GHz band of an LTE and radio waves of a wireless LAN in the 2.4 GHz band.

A parallel circuit of the coil L2 and the capacitors C2A and C2B forms an LC resonance circuit, and the resonance frequency is defined within a transmission frequency band. For example, it resonates in the 2.4 GHz band of the Bluetooth (registered trademark) BLE standard.

The broken lines in FIG. 1 indicate the magnetic field coupling between the coil L1 of the power reception coupling unit PR and the conductor 1 and the magnetic field coupling between the coil L2 of the transmission coupling unit PS and the conductor 1.

Figure 2:
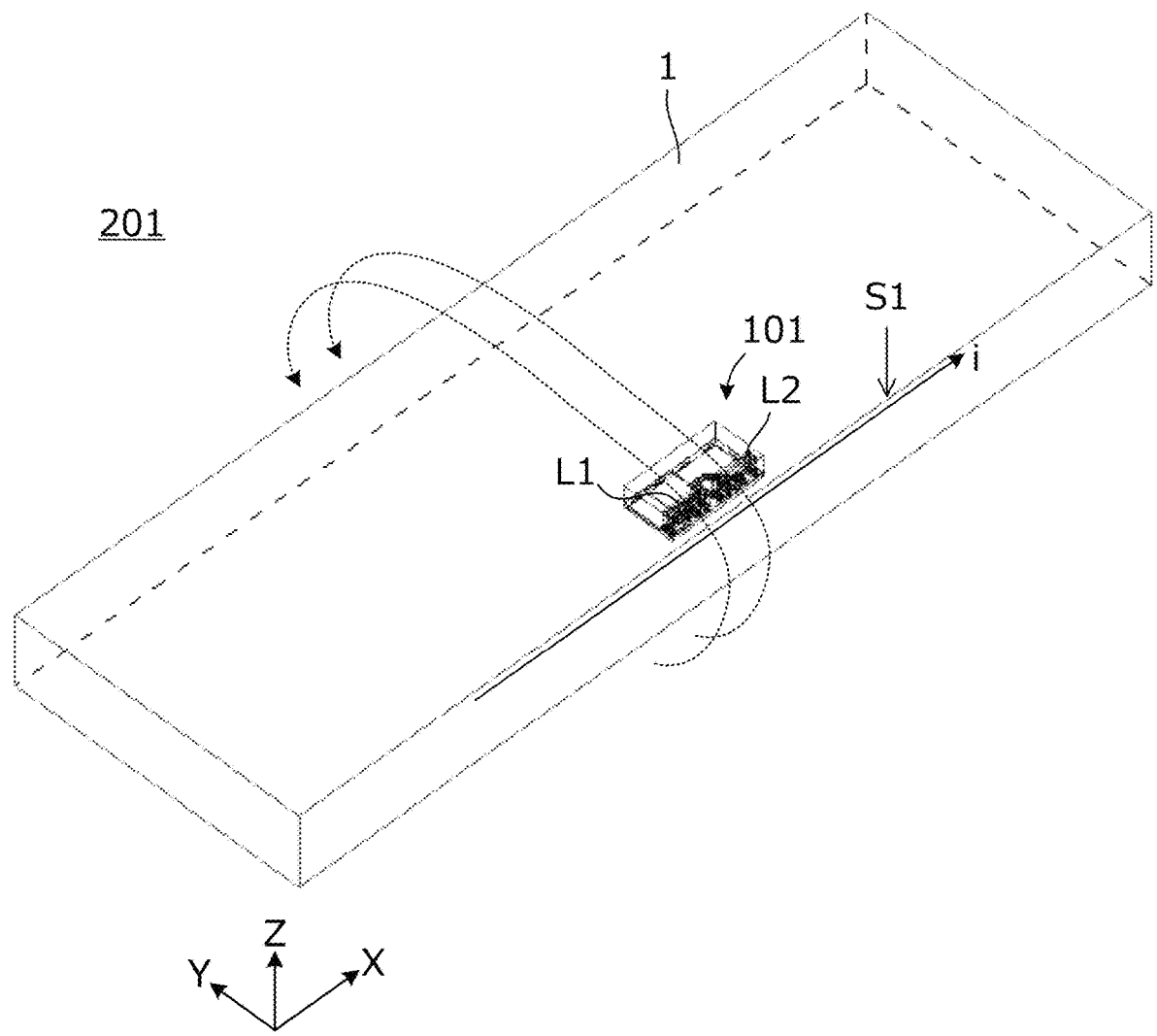
FIG. 2 is a perspective view of the RFID tag 201.

FIG. 2 is a perspective view of the RFID tag 201. As shown, the RFID tag 201 is configured by mounting the RFID module 101 on the rectangular parallelepiped conductor 1. The RFIC 2 and the coils L1 and L2 illustrated in FIG. 1, and other circuit components are provided inside the RFID module 101.

In exemplary aspects, the conductor 1 is an aluminum foil, an aluminum plate, a copper foil, a copper plate, a stainless steel plate, a plated metal plate, or the like.

As shown, the conductor 1 spreads in a planar shape along the X-Y plane and has a longitudinal direction along the X-axis direction at the coordinate axis illustrated in FIG. 2. The RFID module 101 is disposed at a position along the one side S1 of the conductor 1 in the longitudinal direction and closer to the center than both ends of the one side S1 in plan view (when viewed in the Z-axis direction).

Figure 3:
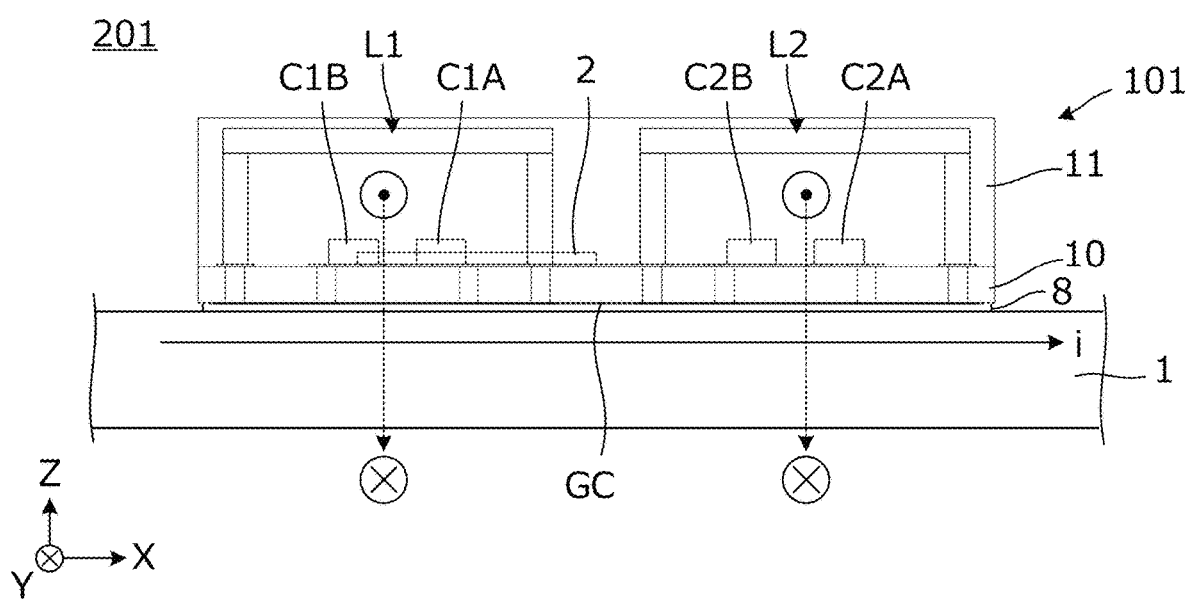
FIG. 3 is a longitudinal sectional view taken along a plane passing through an RFID module 101 mounted on the conductor 1.
Figure 4:
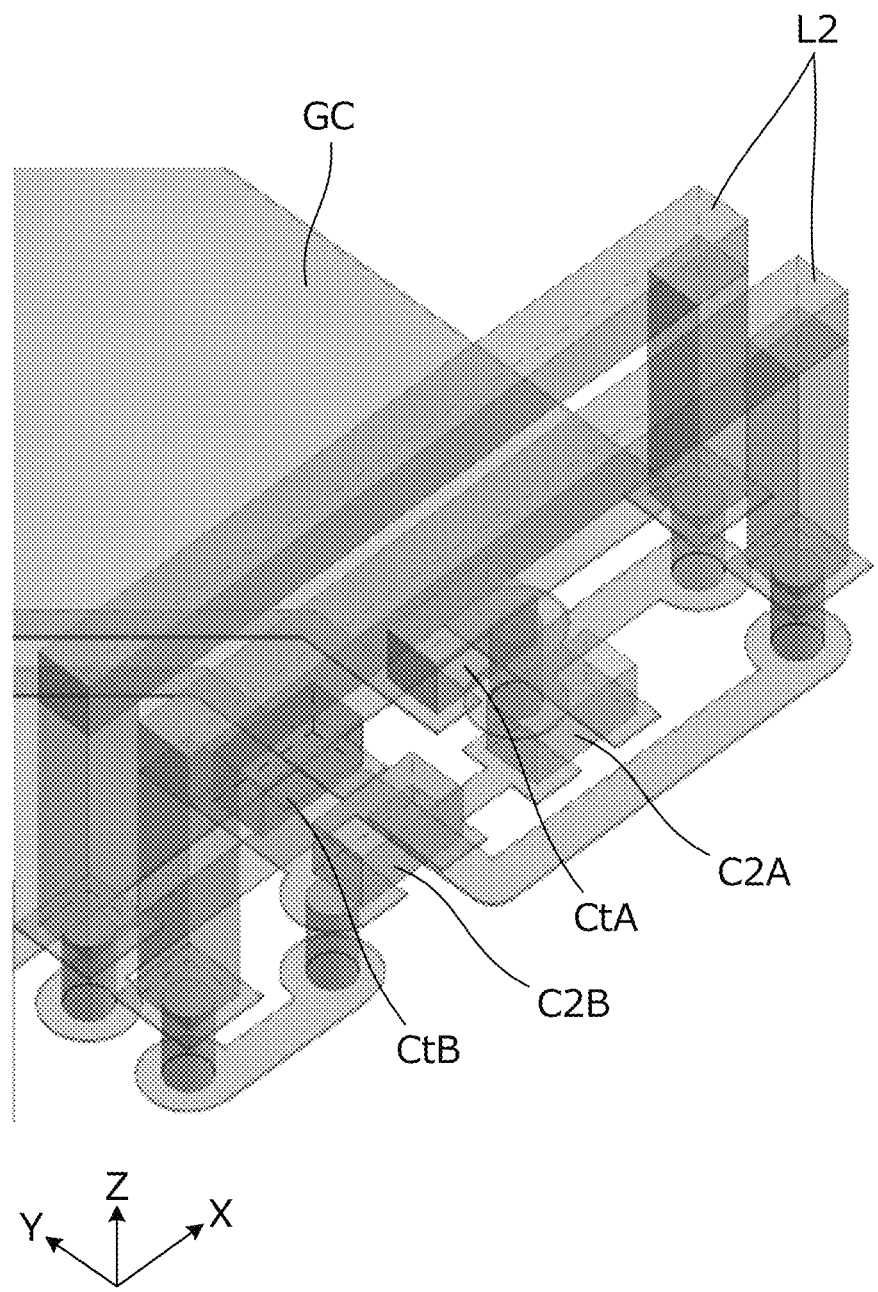
FIG. 4 is a partial perspective view illustrating a configuration of a coil L2 in the RFID module 101 and a mounting state of the chip capacitors C2A, C2B, CtA, and CtB.
Figure 5:
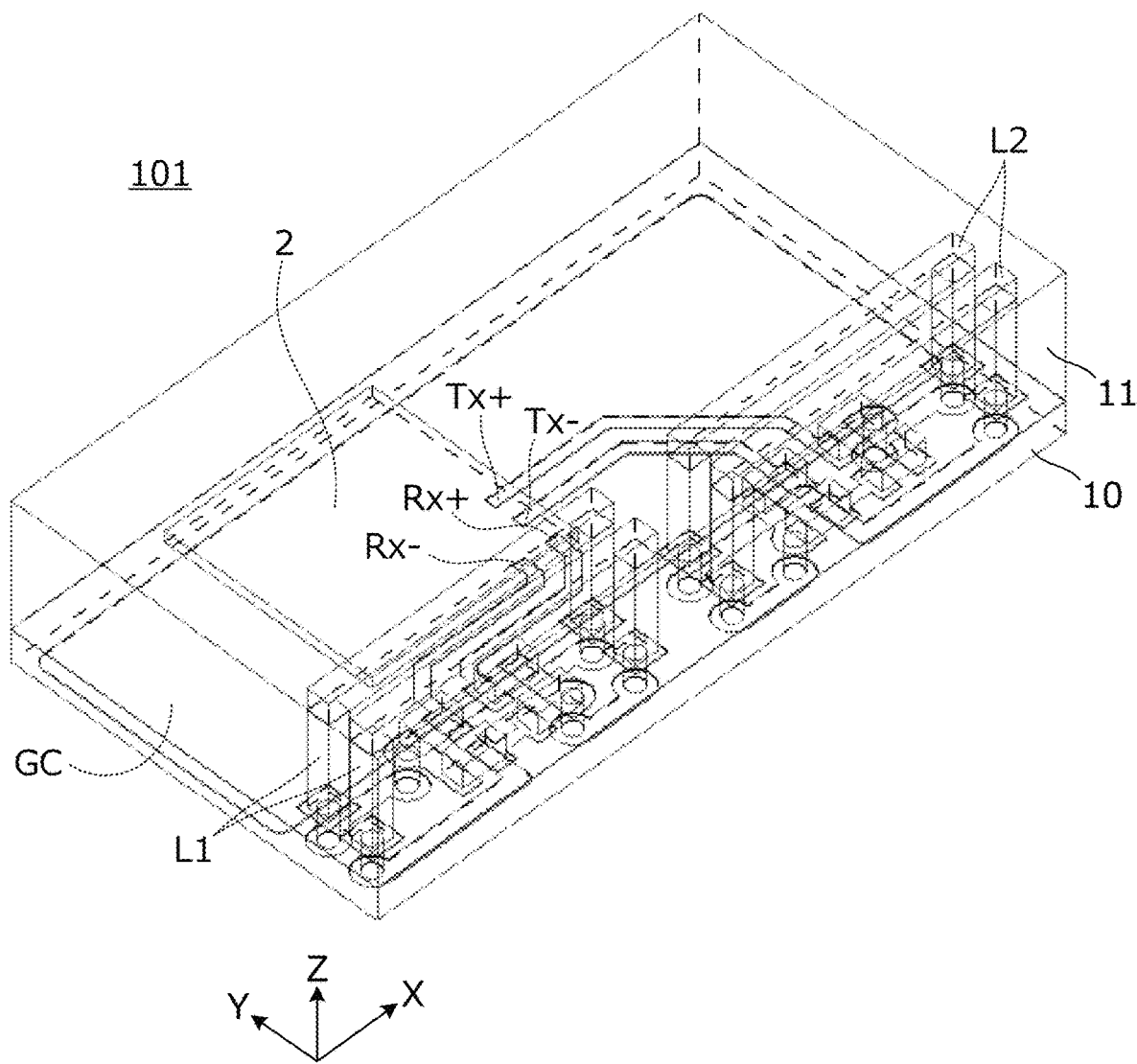
FIG. 5 is a perspective view illustrating a configuration in the RFID module 101.

FIG. 3 is a longitudinal sectional view taken along a plane passing through the RFID module 101 mounted on the conductor 1. FIG. 4 is a partial perspective view illustrating a configuration of the coil L2 in the RFID module 101 and a mounting state of chip capacitors C2A, C2B, CtA, and CtB. FIG. 5 is a perspective view illustrating a configuration in the RFID module 101.

The RFID module 101 includes a substrate 10 of a ceramic substrate made of LTCC (e.g., low temperature co-fired ceramic) or the like, a resin substrate made of glass, epoxy, or the like, or a substrate made of polyimide or the like. The coils L1 and L2 made of a conductive member are formed on the substrate 10. In addition, the chip capacitors C1A, C1B, C2A, C2B, and the like are mounted on the surface of the substrate 10. The coils L1 and L2 and the chip capacitor are covered with a mold resin 11 made of a thermosetting resin such as an epoxy resin or an elastomer, such as polyurethane, on the upper face of the substrate 10.

The RFID module 101 is mounted on the conductor 1 to form the RFID tag 201. For example, a bonding layer 8 is formed on the bottom face of the RFID module 101, and the RFID module 101 is bonded to the surface of the conductor 1 via the bonding layer 8. Instead of the bonding layer 8, for example, adhering may be performed via an adhesive layer such as an acrylic adhesive. Moreover, the adhesive layer can have conductivity to electrically conduct a ground conductor GC to the conductor 1.

As is clear from FIGS. 3, 4, and 5, the coil openings of the coils L1 and L2 provided inside the RFID module 101 are on the X-Z plane, and the coil winding axes of the coils L1 and L2 is directed in the Y-axis direction. That is, the coil openings of the coils L1 and L2 are in the same plane, and the coil winding axes are parallel.

A magnetic flux as indicated by a broken line in FIGS. 2 and 3 circulates through the conductor 1, and a current i indicated by a solid arrow flows through the conductor 1. In this way, the conductor 1 acts as a radiator (e.g., a radiating element).

In the present embodiment, since the coil L1 is for power reception, the magnetic flux generated by the current i induced in the conductor 1 interlinks the coil opening of the coil L1. As a result, a current is induced in the coil L1. In addition, since the coil L2 is for transmission, a current i is induced in the conductor 1 by a current of a transmission signal flowing through the coil L2, and is emitted to the surroundings as an electromagnetic wave.

The current i flowing through the conductor 1 is concentrated at a position along the one side S1 of the conductor 1 due to the edge effect as shown in FIG. 2, for example. In addition, the current density at the central portion is higher than that at both ends in the longitudinal direction. In the present embodiment, since the coil winding axes of the coils L1 and L2 of the RFID module 101 are orthogonal to the one side S1 in the plan view (in a relationship of a twisted position at an angle of 90 degrees in three dimensions), the degree of coupling between the conductor 1 and the coils L1 and L2 is high. Therefore, the effect of the conductor 1 as a radiating element is high.

On the lower face of the substrate 10, a ground conductor GC extending in a planar shape outside a formation region of the coils L1 and L2 is formed. Therefore, noise propagation from the conductor 1 to the RFIC 2 is suppressed, and the wiring from the RFIC 2 to the coils L1 and L2 is hardly affected by the conductor 1, so that characteristic fluctuation is suppressed.

Figure 6:
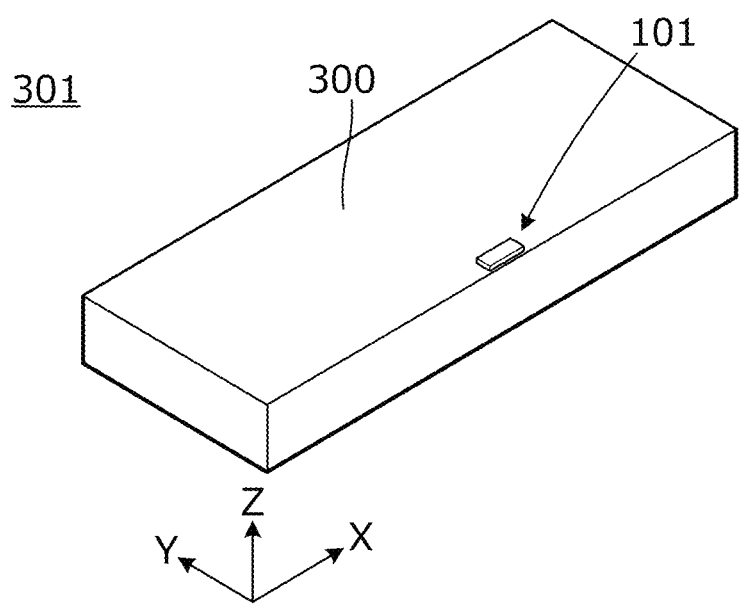
FIG. 6 is a perspective view of an RFID tagged article 301.

FIG. 6 is a perspective view of an RFID tagged article 301. The RFID tagged article 301 includes an article 300, part or all of which is a conductor and the RFID module 101. The RFID module 101 is attached to the conductor of the article 300.

As in the example illustrated in FIG. 6, when the article 300 including the conductor has the longitudinal direction, as in the relationship of the mounting position of the RFID module 101 with respect to the conductor 1 illustrated in FIG. 2, it is preferable that the RFID module is disposed at a position along the one side of the article 300 in the longitudinal direction and closer to the center than both ends of the one side in plan view (e.g., when viewed in the Z-axis direction). This is because the degree of coupling between the article 300 and the coils L1 and L2 can be effectively increased.

In the example illustrated in FIG. 1, the capacitor connected in parallel to the coil L1 is configured by a series circuit of the two capacitors C1A and C1B, but a single capacitor can be connected in parallel to the coil L1 in an alternative aspect. In addition, although the LC parallel resonance circuit is connected to the RFIC 2 via the two capacitors CrA and CrB, the LC parallel resonance circuit can be connected to the RFIC 2 via a single capacitor in an alternative aspect. Alternatively, the LC parallel resonance circuit may be directly connected to the RFIC 2. The same configurations and variations apply to the transmission side.

Second Exemplary Embodiment

In a second exemplary embodiment, an RFID module having an internal structure different from that of the example described in the first embodiment and an RFID tag including the RFID module will be described.

Figure 7:
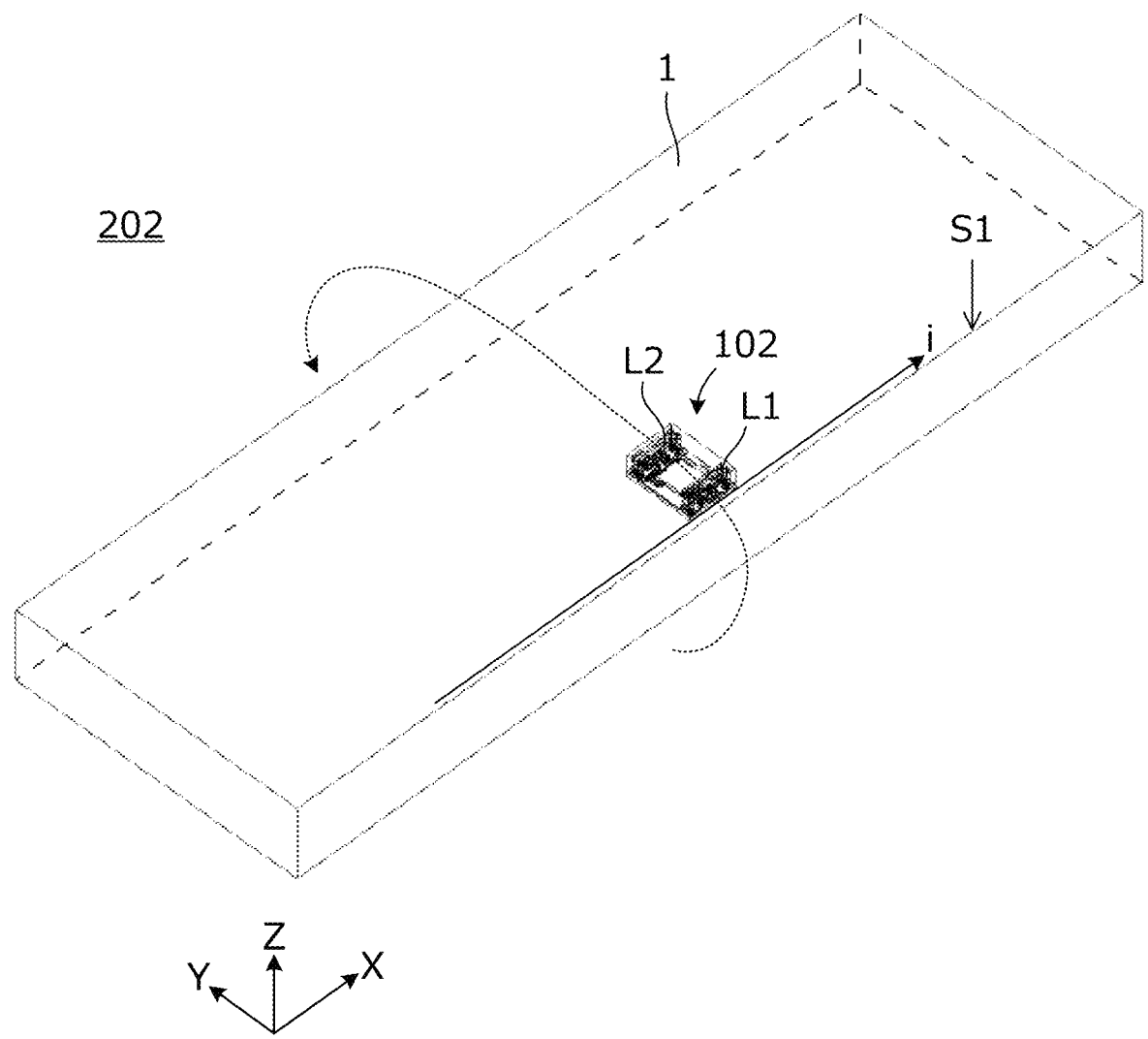
FIG. 7 is a perspective view of an RFID tag 202 according to a second exemplary embodiment.

FIG. 7 is a perspective view of an RFID tag 202. The RFID tag 202 is configured by mounting an RFID module 102 on the rectangular parallelepiped conductor 1. When the RFID module 102 and the RFID tag 202 are represented in a circuit diagram, the configuration is the same as that illustrated in FIG. 1 in the first embodiment. Moreover, the RFIC 2 and the coils L1 and L2 illustrated in FIG. 1, and other circuit components are provided inside the RFID module 102.

As shown in FIG. 7, the conductor 1 spreads in a planar shape along the X-Y plane and has a longitudinal direction along the X-axis direction at the coordinate axis illustrated in FIG. 7. The RFID module 102 is disposed at a position along the one side S1 of the conductor 1 in the longitudinal direction and closer to the center than both ends of the one side S1 in plan view (when viewed in the Z-axis direction).

Figure 8:
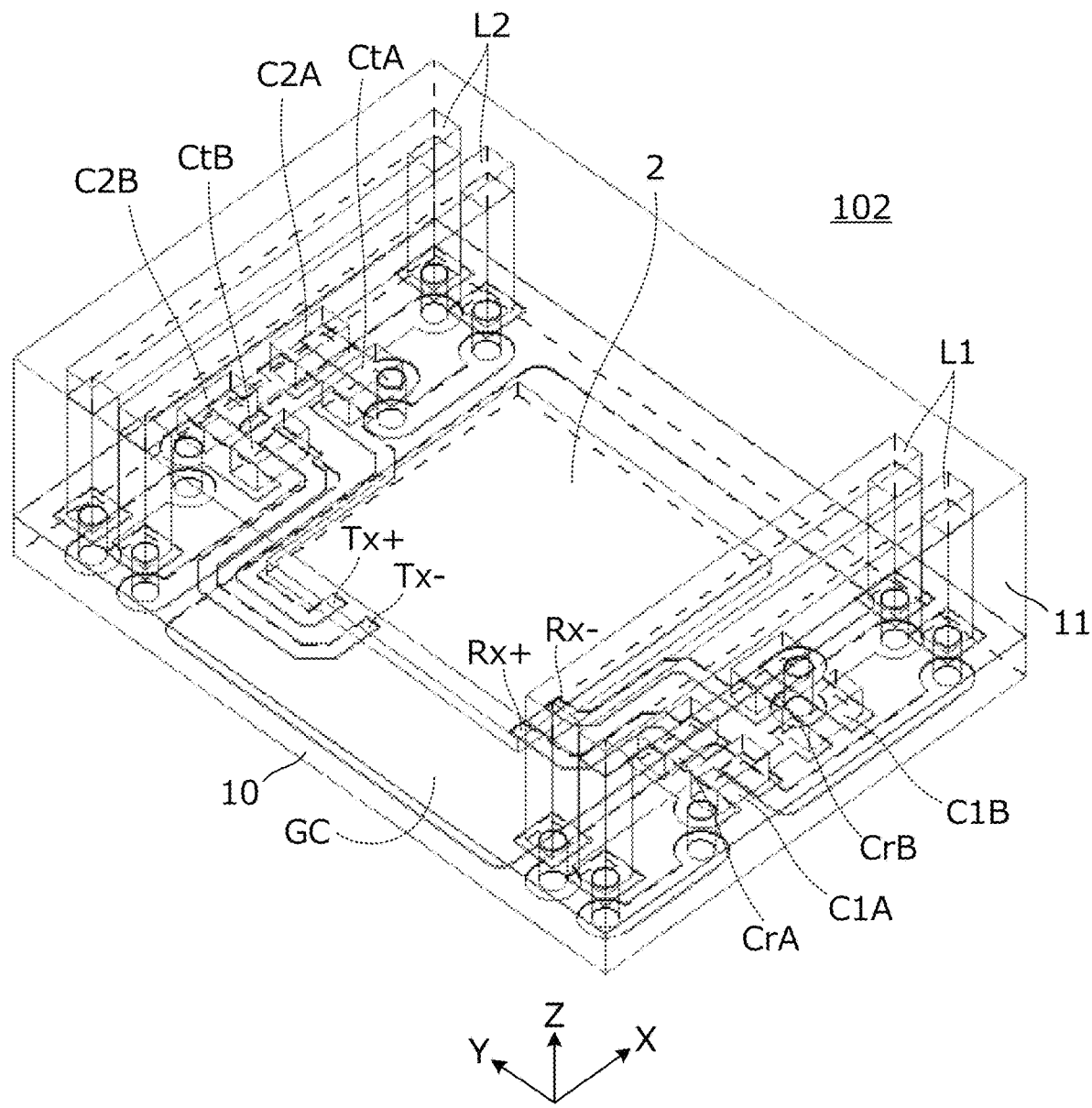
FIG. 8 is a perspective view illustrating a configuration in an RFID module 102.

FIG. 8 is a perspective view illustrating a configuration in the RFID module 102. The RFID module 102 includes the substrate 10. The coils L1 and L2 made of a conductive member are formed on the substrate 10. In addition, chip capacitors C1A, C1B, CrA, CrB, C2A, C2B, CtA, CtB, and the like are mounted on the surface of the substrate 10. The coils L1 and L2 and the chip capacitors are covered with the mold resin 11 on the upper face of the substrate 10.

As is clear from FIGS. 7 and 8, the coil openings of the coils L1 and L2 provided inside the RFID module 102 are on the X-Z plane, and the coil winding axes of the coils L1 and L2 is directed in the Y-axis direction. In this example, the coil winding axes of the coils L1 and L2 are coaxial.

A magnetic flux as indicated by a broken line in FIG. 7 circulates through the conductor 1, and a current i indicated by a solid arrow flows through the conductor 1. In this manner, the conductor 1 acts as a radiator (e.g., a radiating element).

As in the first embodiment, in the present embodiment, since the coil L1 is for power reception, the magnetic flux generated by the current i induced in the conductor 1 interlinks the coil opening of the coil L1. As a result, a current is induced in the coil L1. In addition, since the coil L2 is for transmission, a current i is induced in the conductor 1 by a current of a transmission signal flowing through the coil L2, and is emitted to the surroundings as an electromagnetic wave.

The current i flowing through the conductor 1 is concentrated at a position along the one side S1 of the conductor 1 due to the edge effect in this configuration. In addition, the current density at the central portion is higher than that at both ends in the longitudinal direction. In the present embodiment, since the coil winding axes of the coils L1 and L2 of the RFID module 102 are orthogonal to the one side S1 in the plan view (in a relationship of a twisted position at an angle of 90 degrees in three dimensions), the degree of coupling between the conductor 1 and the coils L1 and L2 is high. Therefore, the effect of the conductor 1 as a radiating element is high.

Specifically, since the coil L1 is located closer to the one side S1 than the coil L2, the degree of coupling between the conductor 1 and the coil L1 is higher than the degree of coupling between the conductor 1 and the coil L2. Therefore, the coil that is required to have a higher coupling degree can be disposed closer to the one side S1.

Third Exemplary Embodiment

In the third exemplary embodiment, an RFID module and an RFID tag in which a transmission coupling unit is electrically coupled to a conductor are shown.

Figure 9:
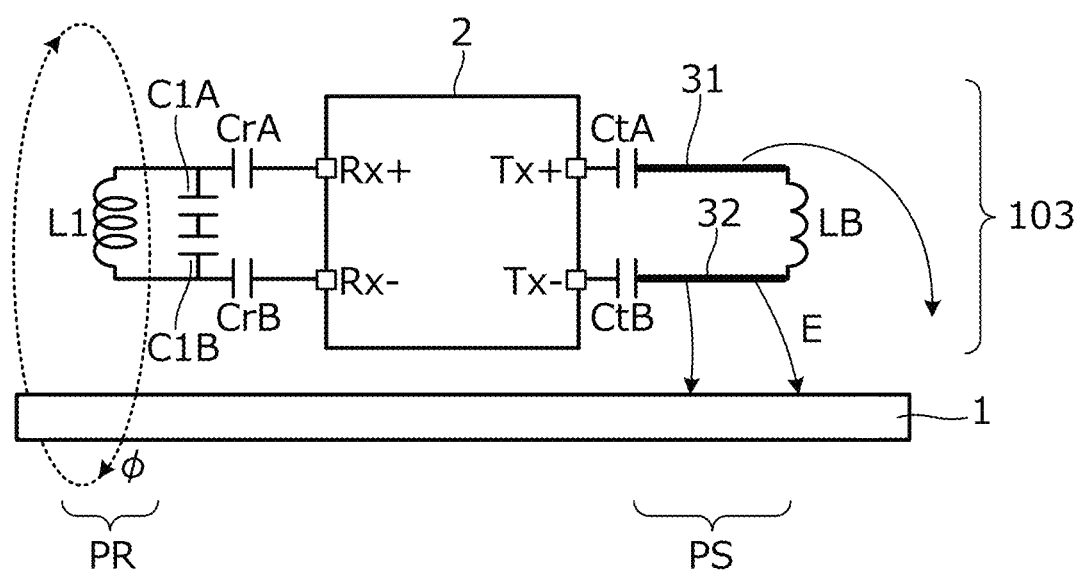
FIG. 9 is a diagram illustrating a circuit configuration of an RFID tag 203 according to a third exemplary embodiment.

FIG. 9 is a diagram illustrating a circuit configuration of an RFID tag 203 according to the third embodiment. As shown, the RFID tag 203 includes the conductor 1 and an RFID module 103 disposed at a position where the RFID module 103 is electromagnetically coupled to the conductor 1.

The RFID module 103 includes the RFIC 2, the power reception coupling unit PR connected to the RFIC 2, and the transmission coupling unit PS connected to the RFIC 2. The configuration of the power reception coupling unit PR is as illustrated in FIG. 1 in the first embodiment. The transmission coupling unit PS in the third embodiment includes planar conductors 31 and 32 that are electrically coupled to the conductor 1. The planar conductors 31 and 32 are connected in series via an inductor LB. The circuit of the planar conductors 31 and 32 and the inductor LB are connected to the transmission terminals Tx+ and Tx− of the RFIC 2 via the capacitors CtA and CtB. A series circuit of the planar conductors 31 and 32, the inductor LB, and the capacitors CtA and CtB constitutes an LC resonance circuit, and the resonance frequency is defined within a transmission frequency band. As a result, the impedance observed in a view toward the transmission coupling unit PS from the transmission terminals Tx+ and Tx− of the RFIC 2 is a predetermined matching impedance.

Moreover, an arrow line in FIG. 9 represents electric lines of force E generated between the planar conductors 31 and 32 of the transmission coupling unit PS and the conductor 1.

In this manner, the transmission coupling unit PS is electrically coupled to the conductor 1.

Figure 10:
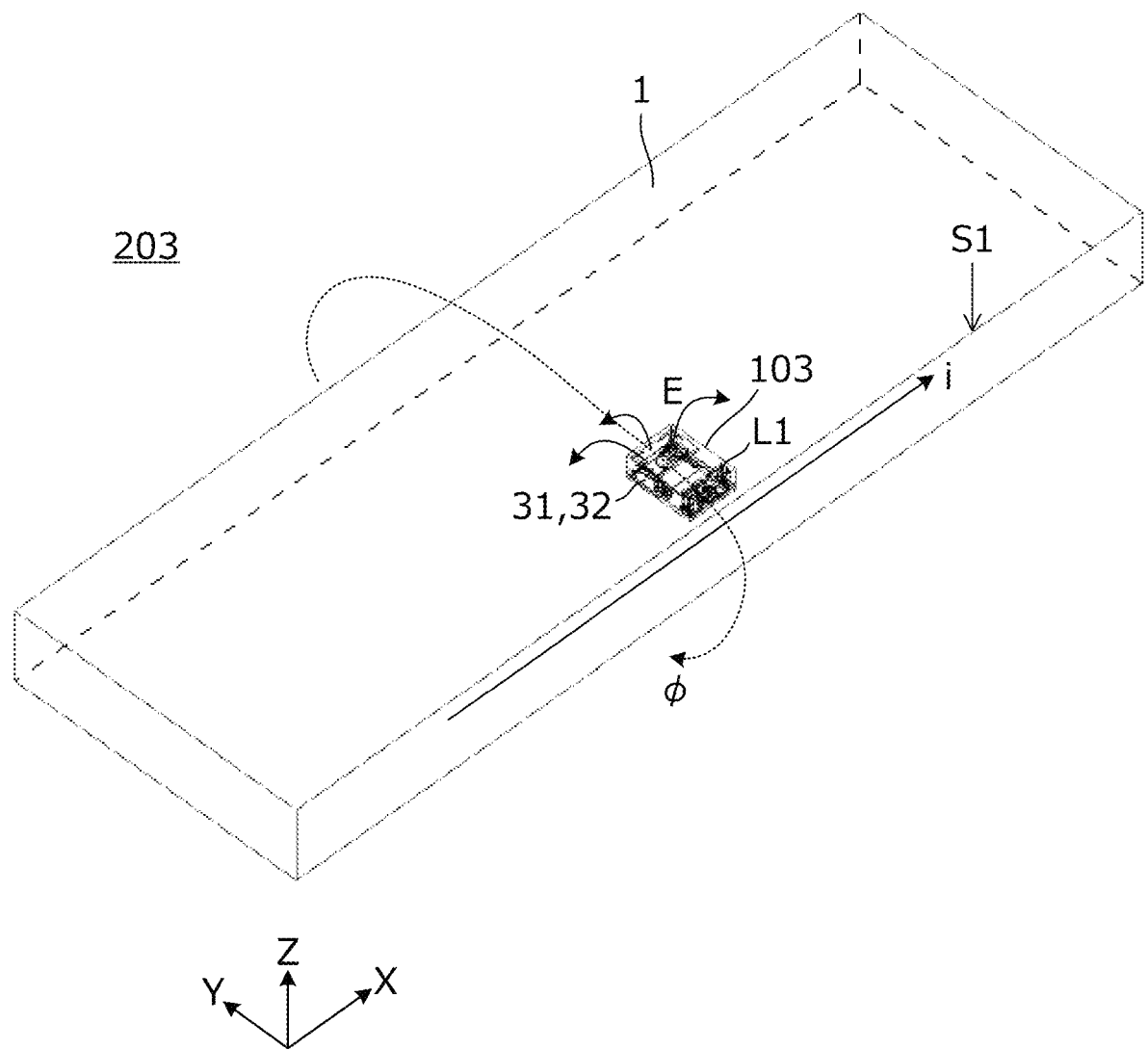
FIG. 10 is a perspective view of the RFID tag 203.

FIG. 10 is a perspective view of the RFID tag 203. The RFID tag 203 is configured by mounting the RFID module 103 on the rectangular parallelepiped conductor 1. The RFIC 2, the coil L1, and the inductor LB illustrated in FIG. 9, and other circuit components are provided inside the RFID module 103.

As shown in FIG. 10, the conductor 1 spreads in a planar shape along the X-Y plane and has a longitudinal direction along the X-axis direction at the coordinate axis illustrated in FIG. 10. The RFID module 103 is disposed at a position along the one side S1 of the conductor 1 in the longitudinal direction and closer to the center than both ends of the one side S1 in plan view (when viewed in the Z-axis direction). The RFID module is disposed such that a coil winding axis of the coil L1 inside the RFID module 103 is directed in the Y-axis direction.

Figure 11:
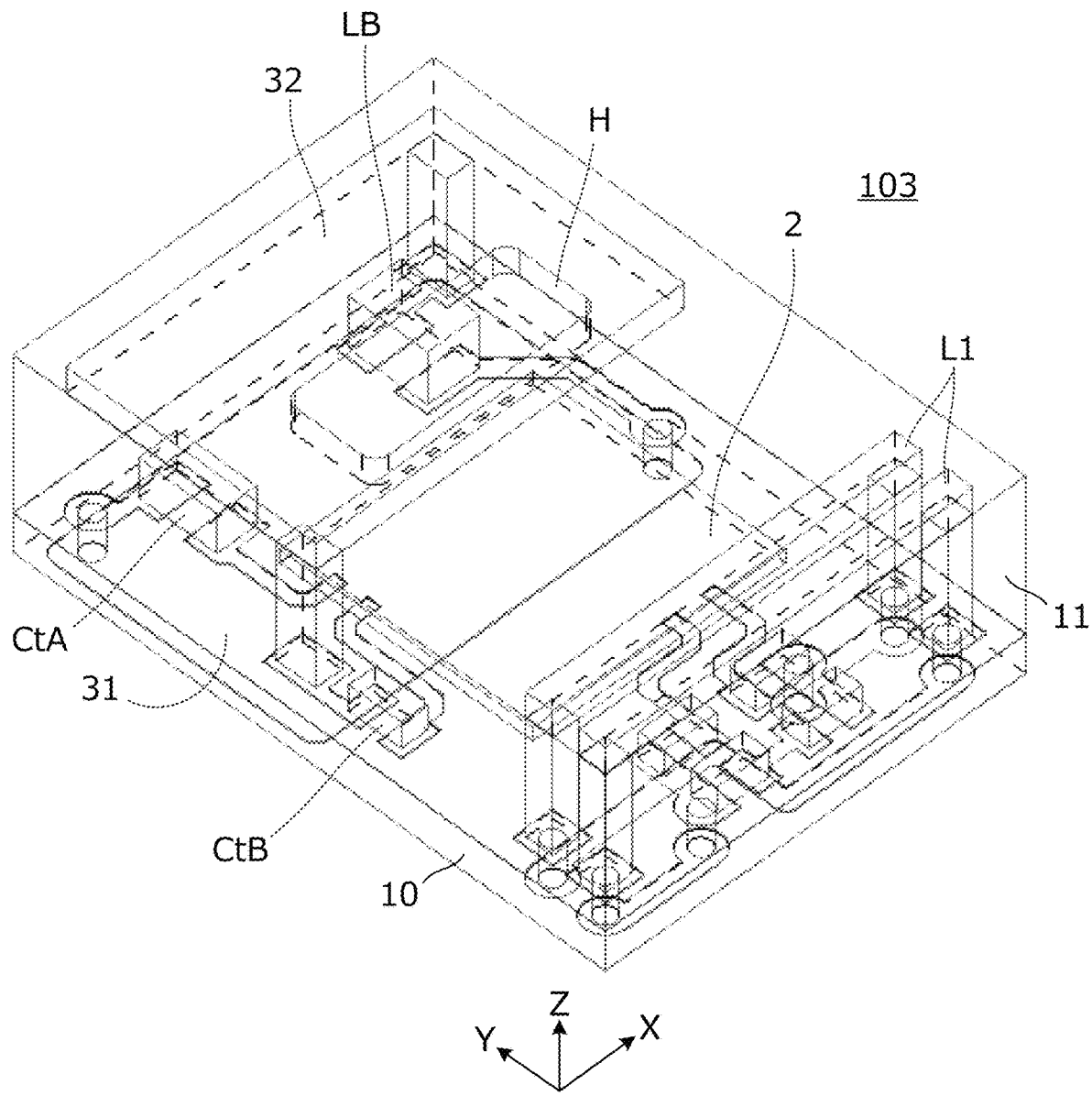
FIG. 11 is a perspective view illustrating a configuration in an RFID module 103.

FIG. 11 is a perspective view illustrating a configuration in the RFID module 103. The RFID module 103 includes the substrate 10. The coil L1 and a planar conductor 32 made of a conductive member are formed on the substrate 10. A planar conductor 31 is formed on the lower face of the substrate 10. In addition, chip components, such as the chip capacitors CtA and CtB, and the chip inductor LB are mounted on the surface of the substrate 10. The coil L1 and the chip components are covered with the mold resin 11 on the upper face of the substrate 10. The configurations of the coil L1 and the circuit portion connected thereto are the same as those in the examples illustrated in FIGS. 4, 5, and 8. In the example illustrated in FIG. 11, an opening H is formed in the planar conductor 32 in order to reduce stray capacitance generated by coupling between the RFIC 2 and the planar conductor 32.

The planar conductors 31 and 32 are parallel to the coil winding axis of the coil L1. Therefore, the eddy current is hardly generated in the planar conductors 31 and 32 by the magnetic flux passing through the coil opening of the coil L1. That is, the planar conductors 31 and 32 do not adversely affect magnetic coupling between the coil L1 and the conductor 1. In addition, since the planar conductors 31 and 32 are away from the coil L1 in plan view, the coil L1 does not adversely affect electric field coupling between the planar conductors 31 and 32 and the conductor 1.

FIG. 10 illustrates magnetic flux φ interlinked with the coil L1 and circulating around the conductor 1. In the present embodiment, as illustrated in FIG. 10, the coil L1 that is magnetically coupled is disposed at a position along the one side of the conductor 1 in the longitudinal direction (X-axis direction) and closer to the center than both ends of the one side, so that the degree of coupling between the conductor 1 and the coil L1 is high. Therefore, the effect of the conductor 1 as a radiating element is high.

In the present embodiment, at the transmission frequency, the electric field is excited such that a half wavelength or ¼ wavelength of the voltage intensity distribution is applied in the short direction (Y-axis direction) of the conductor 1. FIG. 10 illustrates electric lines of force E generated between the planar conductors 31 and 32 and the conductor 1. The planar conductors 31 and 32 are disposed at positions closer (e.g., shifted) to the edge (side S1) than the center of the conductor 1 in the short direction (Y-axis direction). Therefore, electric field coupling between the planar conductors 31 and 32 and the conductor 1 is high, and received power is supplied to the RFIC 2 with high efficiency.

In the example illustrated in FIGS. 10 and 11, the power receiving coil L1 is disposed at the most end in the direction (short direction (Y-axis direction)) of the conductor 1 for which the half wavelength or the ¼ wavelength is applied at the transmission frequency. However, in a case where the electric field coupling between the planar conductors 31 and 32 and the conductor 1 is prioritized, the RFID module 103 may be disposed on the conductor 1 such that the planar conductors 31 and 32 are located at the end of the conductor 1 in the short direction (Y-axis direction) as compared with the coil L1.

In the example illustrated in FIG. 9, the connection circuit of the inductor LB and the planar conductors 31 and 32 is connected to the RFIC 2 via the two capacitors CtA and CtB, but may be connected to the RFIC 2 via a single capacitor in an alternative aspect. In addition, one of the planar conductors 31 and 32 may be directly (direct-current) conducted to the conductor 1. For example, when the planar conductor 32 is conducted to the conductor 1, due to a potential difference between the planar conductor 31 and the conductor 1, an electric field is generated between them.

Fourth Exemplary Embodiment

In the fourth exemplary embodiment, an RFID module and an RFID tag is shown in which a coupling structure between a transmission coupling unit and a conductor or a coupling structure between a power reception coupling unit and a conductor is different from the examples shown in the above.

Figure 12:
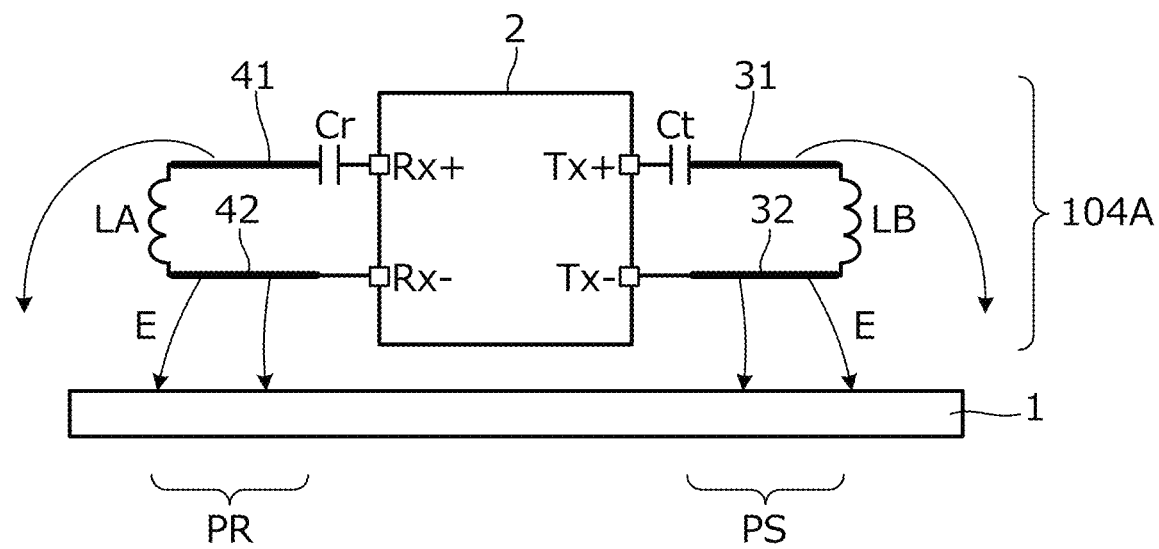
FIG. 12 is a diagram illustrating a circuit configuration of an RFID tag 204A according to a fourth exemplary embodiment.

FIG. 12 is a diagram illustrating a circuit configuration of an RFID tag 204A according to the fourth embodiment. The RFID tag 204A includes the conductor 1 and an RFID module 104A disposed at a position where the RFID module 104A is electromagnetically coupled to the conductor 1.

The RFID module 104A includes the RFIC 2, the power reception coupling unit PR connected to the RFIC 2, and the transmission coupling unit PS connected to the RFIC 2. The power reception coupling unit PR includes planar conductors 41 and 42 that are electrically coupled to the conductor 1. In this configuration, the planar conductors 41 and 42 are connected in series via an inductor LA. The circuit of the planar conductors 41 and 42 and the inductor LA are connected to the power receiving terminals Rx+ and Rx− of the RFIC 2 via a capacitor Cr. The transmission coupling unit PS includes planar conductors 31 and 32 that are electrically coupled to the conductor 1. The planar conductors 31 and 32 are connected in series via an inductor LB. The circuit of the planar conductors 31 and 32 and the inductor LB are connected to the transmission terminals Tx+ and Tx− of the RFIC 2 via the capacitor Ct.

Arrows in FIG. 12 indicate electric lines of force E generated between the planar conductors 41 and 42 of the power reception coupling unit PR and the conductor 1, and lines of electric force E generated between the planar conductors 31 and 32 of the transmission coupling unit PS and the conductor 1. In this manner, both the power reception coupling unit PR and the transmission coupling unit PS are electrically coupled to the conductor 1.

A series circuit of the planar conductors 41 and 42, the inductor LA, and the capacitor Cr forms an LC resonance circuit, and the resonance frequency is defined within the power reception frequency band. As a result, the impedance observed in a view toward the power reception coupling unit PR side from the power receiving terminals Rx+ and Rx− of the RFIC 2 is a predetermined matching impedance. Similarly, the series circuit of the planar conductors 31 and 32, the inductor LB, and the capacitor Ct forms an LC resonance circuit, and the resonance frequency is defined within the transmission frequency band. As a result, the impedance observed in a view toward the transmission coupling unit PS from the transmission terminals Tx+ and Tx− of the RFIC 2 is a predetermined matching impedance.

As in the RFID tag 204A, both the power reception coupling unit and the transmission coupling unit of the RFID module 104A may be configured to be electrically coupled to the conductor 1.

Figure 13:
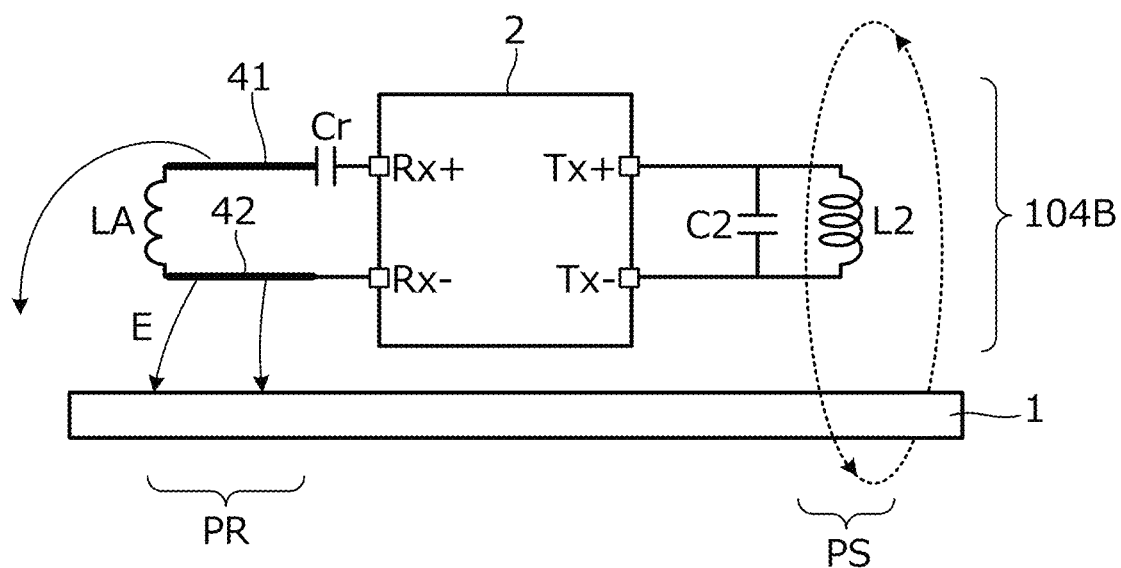
FIG. 13 is a diagram illustrating a circuit configuration of another RFID tag 204B according to the fourth exemplary embodiment.

FIG. 13 is a diagram illustrating a circuit configuration of another RFID tag 204B according to the fourth exemplary embodiment. The RFID tag 204B includes the conductor 1 and an RFID module 104B disposed at a position where the RFID module 104B is electromagnetically coupled to the conductor 1.

As shown, the RFID module 104B includes the RFIC 2, the power reception coupling unit PR connected to the RFIC 2, and the transmission coupling unit PS connected to the RFIC 2. The power reception coupling unit PR includes planar conductors 41 and 42 that are electrically coupled to the conductor 1. The planar conductors 41 and 42 are connected in series via the inductor LA. The circuit of the planar conductors 41 and 42 and the inductor LA are connected to the power receiving terminals Rx+ and Rx− of the RFIC 2 via the capacitor Cr. The transmission coupling unit PS includes the coil L2 that is magnetically coupled to the conductor 1. A capacitor C2 is connected in parallel to the coil L2 to form an LC parallel resonance circuit. The LC parallel resonance circuit is connected to the transmission terminals Tx+ and Tx− of the RFIC 2.

As in the RFID tag 204B, the power reception coupling unit of the RFID module 104B may be configured to be electrically coupled to the conductor 1, and the transmission coupling unit may be configured to be magnetically coupled to the conductor 1.

Fifth Exemplary Embodiment

In the fifth embodiment, an RFID module and an RFID tag including an RFIC having an unbalanced terminal will be described.

Figure 14A:
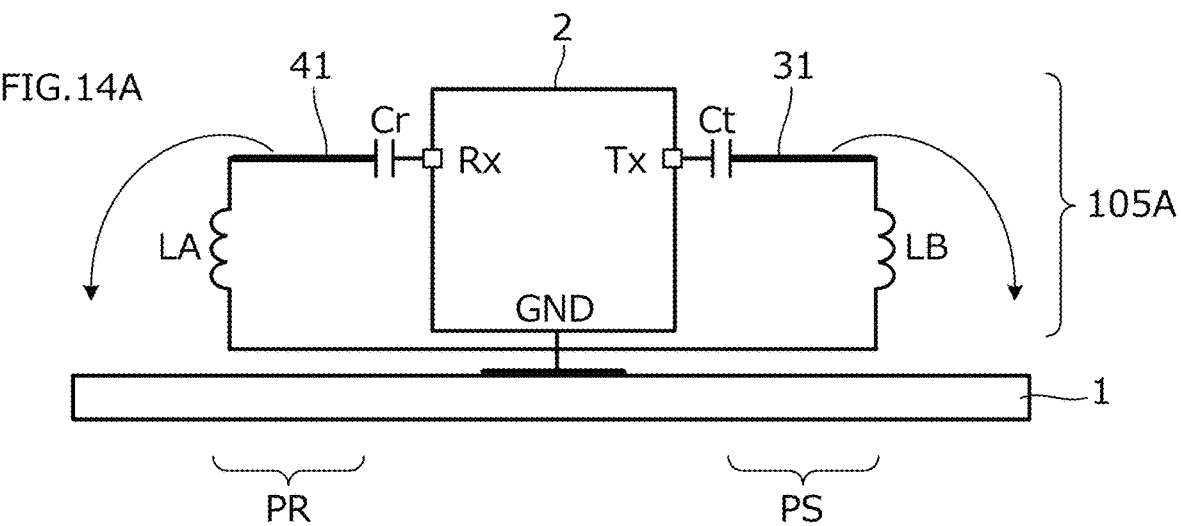
FIG. 14A is a diagram illustrating a circuit configuration of an RFID tag 205A according to a fifth exemplary embodiment.

FIG. 14A is a diagram illustrating a circuit configuration of an RFID tag 205A according to the fifth embodiment. The RFID tag 205A includes the conductor 1 and an RFID module 105A disposed at a position where the RFID module 105A is electromagnetically coupled to the conductor 1.

The RFID module 105A includes the RFIC 2, and the power reception coupling unit PR and the transmission coupling unit PS connected to the RFIC 2. The power reception coupling unit PR includes a planar conductor 41 electrically coupled to conductor 1. The inductor LA is connected in series to the planar conductor 41. The circuit of the planar conductor 41 and the inductor LA are connected between the power receiving terminal Rx of the RFIC 2 and a ground GND via the capacitor Cr. The transmission coupling unit PS includes the planar conductor 31 electrically coupled to the conductor 1. The inductor LB is connected in series to the planar conductor 31. The circuit of the planar conductor 31 and the inductor LB are connected between the transmission terminal Tx of the RFIC 2 and the ground GND via the capacitor Ct. The ground GND is connected to the conductor 1.

Figure 14B:
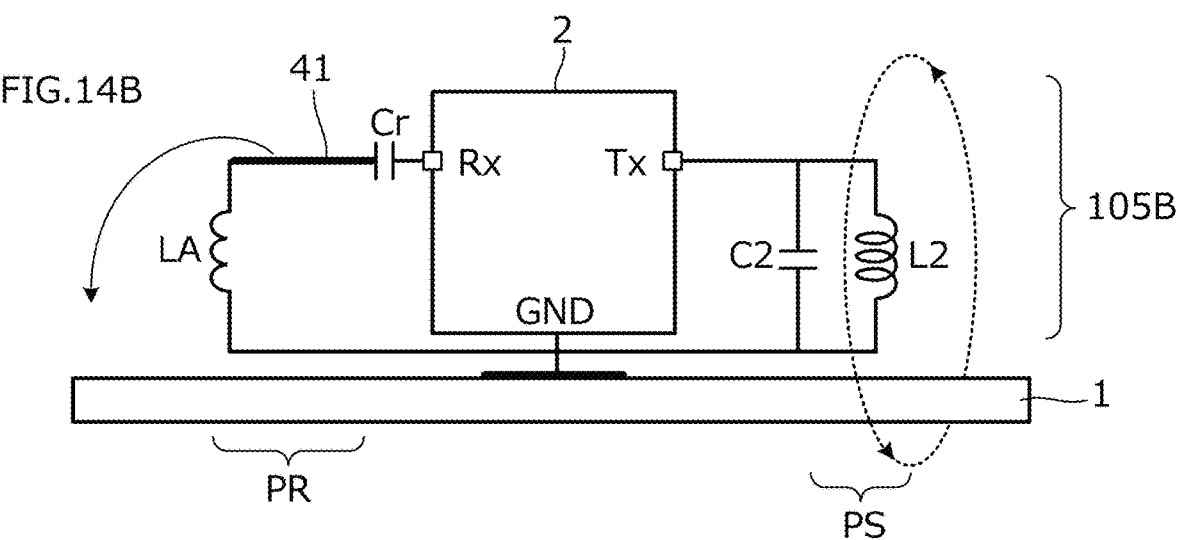
FIG. 14B is a diagram illustrating a circuit configuration of another RFID tag 205B according to the exemplary fifth embodiment.

FIG. 14B is a diagram illustrating a circuit configuration of another RFID tag 205B according to the fifth embodiment. The RFID tag 205B includes the conductor 1 and an RFID module 105B disposed at a position where the RFID module 105B is electromagnetically coupled to the conductor 1.

The RFID module 105B includes a RFIC 2, and the power reception coupling unit PR and the transmission coupling unit PS connected to the RFIC 2. The transmission coupling unit PS includes the coil L2 magnetically coupled to the conductor 1. The capacitor C2 is connected in parallel to the coil L2. The parallel circuit is connected between the transmission terminal Tx of the RFIC 2 and the ground GND. The ground GND is connected to the conductor 1. The configuration of the power reception coupling unit is similar to that of the RFID module 105A.

As described above, an RFIC including an unbalanced terminal can also be used in an exemplary aspect. In addition, the power reception coupling unit PR or the transmission coupling unit PS may be directly conducted to the conductor 1.

Sixth Exemplary Embodiment

In the sixth exemplary embodiment, an RFID tag in which the mounting position of the RFID module on the conductor is different from that of the example described above is described.

Figure 15A:
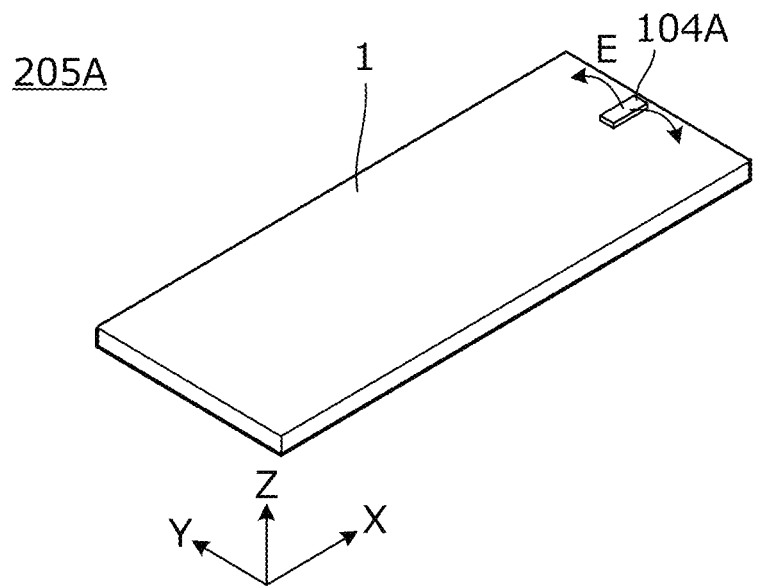
FIG. 15A is a perspective view of the RFID tag 205A according to a sixth exemplary embodiment.
Figure 15B:
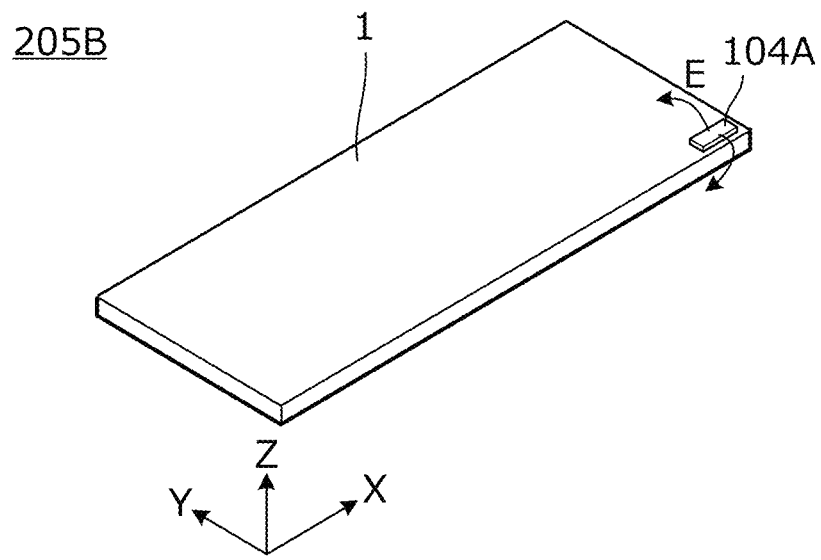
FIG. 15B is a perspective view of another RFID tag 205B according to the sixth exemplary embodiment.

FIG. 15A is a perspective view of the RFID tag 205A, and FIG. 15B is a perspective view of the RFID tag 205B. Each of the RFID tags is configured by mounting the RFID module 104A on the rectangular parallelepiped conductor 1. The configuration of the RFID module 104A is as illustrated in FIG. 12 in the fourth embodiment.

In the example illustrated in FIG. 15A, the RFID module 104A is disposed at the end of the conductor 1 in the longitudinal direction (e.g., X-axis direction) and at the center of the conductor 1 in the short direction (e.g., Y-axis direction) in plan view (when viewed in the Z-axis direction). In the example illustrated in FIG. 15B, the RFID module 104A is disposed at the end of the conductor 1 in the longitudinal direction (e.g., X-axis direction) and at an end of the conductor 1 in the short direction (e.g., Y-axis direction) in plan view (when viewed in the Z-axis direction).

In the present embodiment, at the transmission frequency or the power reception frequency, the electric field is excited such that a half wavelength or ¼ wavelength of the voltage intensity distribution is applied in the longitudinal direction (X-axis direction) of the conductor 1. Therefore, as illustrated in FIGS. 15A and 15B, high electric field coupling strength can be obtained by disposing the RFID module 104A at the end of the conductor 1 in the longitudinal direction (e.g., X-axis direction) in plan view (when viewed in the Z-axis direction).

In addition, in a case where an electric field is excited such that a half wavelength or ¼ wavelength of a voltage intensity distribution is applied in the longitudinal direction (e.g., X-axis direction) of the conductor 1 at the first frequency, and an electric field is excited such that a half wavelength or ¼ wavelength of a voltage intensity distribution is applied in the short direction (e.g., Y-axis direction) of the conductor 1 at the second frequency, as illustrated in FIG. 15B, the RFID module 104A is disposed at the end of the conductor 1 in the longitudinal direction and at the end of the conductor 1 in the short direction, whereby high electric field coupling strength is obtained at both the first frequency and the second frequency.

Finally, it is noted that the description of the above-described embodiments is illustrative in all respects and is not restrictive. Modifications and changes can be made as appropriate by those skilled in the art.

For example, in any of the embodiments described above, the power reception coupling unit PR is single, but a plurality of power reception coupling units may be provided in alternative aspects. Further, an RFIC having a plurality of sets of power receiving terminals Rx+ and Rx− may be used. In this case, a power reception coupling unit to be magnetically coupled and a power reception coupling unit to be electrically coupled can be provided in an exemplary aspect.

In addition, FIG. 6 illustrates an example in which the RFID tagged article 301 is configured by providing the RFID module 101 in the article 300, but it goes without saying that the RFID module having the configuration illustrated in the second and subsequent embodiments can be applied as an RFID module.

REFERENCE SIGNS LIST

C1A, C1B, CrA, CrB, C2A, C2B, CtA, CtB chip capacitor
C2, Cr, Ct capacitor
GC ground conductor
L1 power receiving coil
L2 transmission coil
LA, LB Inductor
PR power reception coupling unit
PS transmission coupling unit
Rx, Rx+, Rx− power receiving terminal
S1 side
Tx, Tx+, Tx− transmission terminal
1 conductor
2 RFIC
8 bonding layer
10 substrate
11 mold resin
31, 32, 41, 42 planar conductor
101, 102, 103, 104A, 104B, 105A, 105B RFID module
201, 202, 203, 204A, 204B, 205A, 205B RFID tag
300 article
301 RFID tagged article

The invention claimed is:

1. An RFID tag comprising:
a conductor having a planar surface; and
an RFID module configured to be electromagnetically coupled to the conductor, such that the RFID module is entirely overlapped by at least a portion of the planar surface of the conductor when viewed in a direction normal to the planar surface of the conductor, the RFID module including:
  an RFIC configured to receive power induced by receiving an electromagnetic wave for power reception to output a transmission signal;
  a power reception coupling unit configured to electromagnetically couple to the conductor to receive the power; and
  a transmission coupling unit configured to electromagnetically couple to the conductor to output the transmission signal to the conductor,
  wherein either the power reception coupling unit or the transmission coupling unit includes a planar conductor configured to electrically couple to the conductor.

2. The RFID tag according to claim 1, wherein the power reception coupling unit includes a coil configured to magnetically couple to the conductor.

3. The RFID tag according to claim 1, wherein the power reception coupling unit includes the planar conductor configured to electrically couple to the conductor.

4. The RFID tag according to claim 1, wherein the transmission coupling unit includes a coil configured to magnetically couple to the conductor.

5. The RFID tag according to claim 1, wherein the transmission coupling unit includes the planar conductor configured to electrically couple to the conductor.

6. The RFID tag according to claim 2, wherein the conductor extends in a longitudinal direction, and the coil of the power reception coupling unit is disposed at a position along one side of the conductor in the longitudinal direction and closer to a center than both ends of the one side.

7. The RFID tag according to claim 3, wherein the planar conductor of the power reception coupling unit is disposed at a position closer to an edge than a center of the conductor.

8. The RFID tag according to claim 2, further comprising a capacitor that LC resonates with the coil of the power reception coupling unit.

9. The RFID tag according to claim 3, further comprising an inductor and a capacitor that are connected to the planar conductor, wherein the planar conductor, the inductor, and the capacitor form an LC resonance circuit.

10. The RFID tag according to claim 1, wherein the electromagnetic wave for power reception is in a frequency band that is a same frequency band of the transmission signal.

11. The RFID tag according to claim 1, further comprising:
a first capacitor connected to the power reception coupling unit; and
a second capacitor connected to the transmission coupling unit.

12. The RFID tag according to claim 11, wherein:
the power reception coupling unit and the first capacitor form a power reception LC resonance circuit, and
the transmission coupling unit and the second capacitor form a transmission LC resonance circuit.

13. The RFID tag according to claim 12, wherein a resonance frequency of the power reception LC resonance circuit is in a frequency band that is a same frequency band as a resonance frequency of the transmission LC resonance circuit.

14. The RFID tag according to claim 1, wherein respective series circuits having a pair of capacitors are each connected in parallel to coils of the power reception coupling unit and the transmission coupling unit to form respective LC parallel resonance circuits.

15. The RFID tag according to claim 1, wherein coil winding axes of the respective coils are orthogonal to a side of the conductor in a plan view thereof.

16. The RFID tag according to claim 15, wherein the RFID module is configured to be disposed on the side of the conductor, such that a current flowing through the conductor is concentrated at a position along the side of the conductor and a current density at the central portion is higher than that at both ends in a longitudinal direction of the side of the conductor.

17. An RFID tagged article comprising:
the RFID tag according to claim 1; and
an article.

18. The RFID tag according to claim 1, wherein only one of the power reception coupling unit and the transmission coupling unit includes a planar conductor configured to electrically couple to the conductor.

* * * * *